Patented July 3, 1934

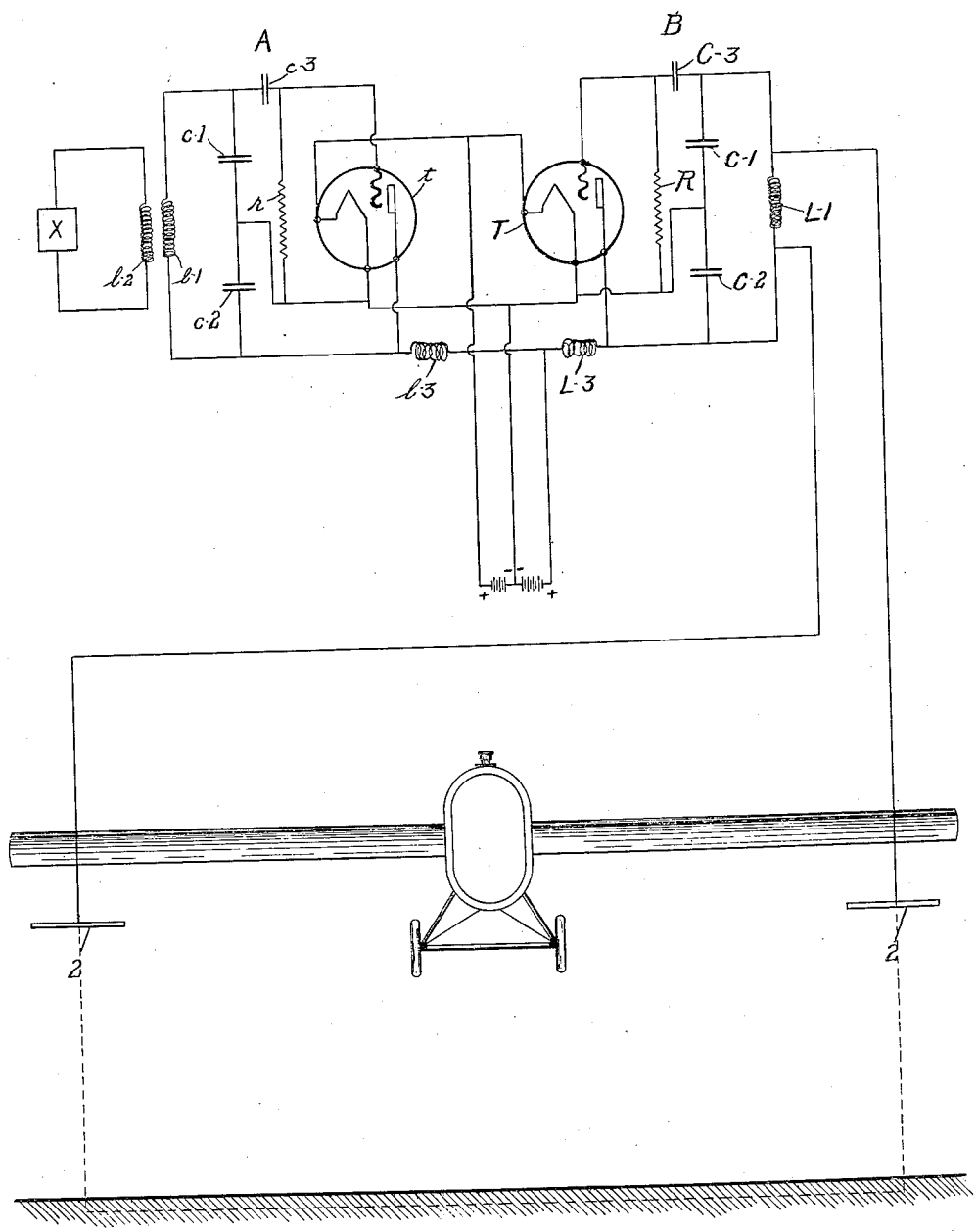

1,965,147

UNITED STATES PATENT OFFICE 1,965,147

CAPACITY ALTIMETER

Orin E. Marvel, Dayton, Ohio, assignor to Bendix Aviation Corporation, New York, N. Y., a corporation of Delaware Application February 13, 1923, Serial No. 618,809

19 Claims. (Cl. 177—352)

This invention relates to instruments of the kind used for the determination of the distance of an object, such as an aeroplane or balloon above the earth; and one object of my invention is to provide a device of this kind, which will indicate by electrical means, the distance of an object above the earth. A further object is to produce a device which will enable the pilot of an aeroplane to land safely in the dark by keeping him informed of his approximate height above the ground.

Other objects will be more particularly set forth in the attached specification and claims.

In the drawing, the figure shows diagrammatically the electrical attachments used in the preferred form of my invention.

Mounted upon the aeroplane in such a manner as to produce a capacitive effect through the ground below are two metallic plates 2—2. These plates are preferably mounted in horizontal position, one near each wing tip and below the wing and insulated therefrom. Mounted in any suitable position in the aeroplane are two radio oscillating circuits A, B. Circuit A comprises a vacuum tube $t$, fixed condensers $c_1$, $c_2$, $c_3$, resistance $r$, and inductances $l_1$, $l_2$, and impedances $l_3$. Inductances $l_1$ and $l_2$ are loosely connected as shown, and a telephone receiver X or a suitable recording device is connected to the inductance $l_2$. Circuit B is comprised of tube T fixed condensers $C_1$, $C_2$, $C_3$, inductances $L_1$ and impedances $L_3$ and resistance R. Connected to both circuits in parallel are the filament and the plate batteries as shown, 6 volts being preferably used for the energization of the filaments and 22½ volts being used for the plate circuits.

The two plates 2, 2, are connected, one to each side of the inductance $L_1$ in circuit B and the effect of the plates is to provide a condenser, the effect of which will vary according to the distance between the aeroplane and the earth, as the dielectric between the plates is the air from one plate to ground, through the ground a short distance and back to the other plate as shown in dotted lines in the figure. There is also a capacitive effect of constant amount directly between the plates but as the plates are positioned horizontally edge to edge, this effect would be small. There would also be a small constant capacitive effect from one plate, to the metallic structure, if any exists, of the wing above, through this structure to the other wing and then down to the other plate; but this effect may be minimized by the avoidance of metallic parts in the wing construction or by reduction in the horizontal area of the metallic parts used. It is clear therefore, that the effect of the plate connection to the circuit B is to provide a condenser, the capacitive effect of which is approximately a function of the distance of the aeroplane above ground regardless of the altitude. The capacity would be small when the aeroplane is high in the air and greater when the plane is near the ground.

The values of the resistances and the fixed condensers in the two circuits are the same in each so that when the impedance due to the coils as $l_2$ and $l_1$, together with the receiver, is made equal, on the one hand, to the impedance of the coil $L_1$, and the small inherent capacity of plates 2—2, (with the aeroplane in the air) on the other hand; then the two circuits will each have equal natural frequencies and the batteries will produce radio frequency oscillations of the same frequency in both circuits. No sound will be heard at this time in the receiver, as the oscillations in the two circuits will neutralize.

When the aeroplane ascends or descends a very short distance from the point at which no note is heard in the receiver, the impedance of circuit B changes due to the decrease or increase of the capacity between the plates 2—2 in circuit B. The natural frequency of circuit B is therefore changed while the natural frequency of circuit A remains constant. Radio frequency oscillations will now be produced in the two circuits which differ in value, say for example 80 cycles per second. A beat note of 80 cycles per second is therefore produced in the receiver which is audible as a very low note in the ear of the pilot. When the aeroplane is a few thousand feet in the air, the difference in the frequency oscillations of circuits A and B is great, due to the comparatively large change in the capacity of plates 2—2 and no sound will be audible in the receiver, the difference in frequencies being greater than 20,000 cycles per second which is above the range of audible frequency.

It will be obvious that the circuits may be adjusted so that the frequency of the two circuits A and B is the same when the aeroplane is a few feet from the ground and a low note heard just above this elevation, the high note being heard when the aeroplane is a few hundred feet in the air. It is preferred however to so adjust the values of the inductances $L_1$ or $l_1$ that the natural frequencies of circuits A and B are the same and no sound audible in the receiver when the aeroplane is about 50 feet from the ground. With this adjustment when the aeroplane gets to about 400 feet from the ground and the difference between the frequencies of circuits A and B is less than 20,000 cycles a very high note is heard. As the plane nears the ground the frequency of the beat note becomes lower and lower until an extremely low note is heard which may be taken as a warning for pilot to start to level off for landing. At forty feet a low note would again be audible and the note heard would then become higher and higher until the plane touches the ground. At fifty feet elevation no sound at all would be heard.

The instrument would be calibrated, so that it would be known what the distance is between plane and ground by the pitch of the note in the receiver. This is of the utmost importance when attempting to land in a dark night or in a fog. This invention will undoubtedly prove of great value to warn the pilot of an unseen mountain peak or high building when visibility is poor.

It will be obvious that the parts 2—2 which form the condenser need not necessarily be flat plates or be located at the wing tips. If desired, a single vacuum tube circuit may be used, the receiver or other indicating device and the condenser plates being connected in this circuit.

Having set forth the preferred form of my invention, what I desire to claim and secure by Letters Patent is:

1. The method of determining the distance between two bodies, one of which carries a plurality of capacity elements in influencing relation to each other, which consists in moving one of the bodies with respect to the other and measuring the change in capacity between said capacity elements as a function of distance.

2. The method of determining the distance between two bodies, one of which carries a plurality of capacity elements in influencing and fixed relation to each other, which consists in moving one of the bodies with respect to the other and measuring the change in capacity between said capacity elements as a function of distance.

3. The method of determining the distance between two bodies, one of which carries two capacity elements in influencing relation to each other and said influencing relation subject to change with change in distance between said bodies, which consists in moving one of the bodies with respect to the other and measuring the change in capacity between said elements as a function of said distance.

4. The method of determining the distance between the earth and an aircraft, which consists in arranging a plurality of capacity elements upon the aircraft in influencing relation to each other and said influencing relation subject to change with change of distance between the aircraft and earth, and measuring the change in capacity between said elements as a function of such distance.

5. The method of measuring the distance between two objects which consists in attaching to one of said objects an electrically oscillating system whose frequency is dependent upon the capacity of two conductors forming a part of said system and at a distance from each other, and radiating electric waves by setting said system in oscillation, varying the frequency of said electric oscillations by bringing said object to which said oscillating system is attached into proximity to said other object, and measuring the amount of said change in said oscillation frequency.

6. The method of measuring the distance between one object and a second object, the second object being movable relative to the first and comprising two capacities, which consists in charging said capacities to opposite polarities, producing an indication by means of said charge, varying the indication by varying the distance between said two objects, and measuring the amount of said variation of the said indication.

7. An instrument for indicating the distance of an aeroplane above the earth and adapted to be carried by the aeroplane, comprising an electrical oscillating circuit, a condenser in said circuit formed of a plurality of members, said members being widely separated whereby variations of the distance above the ground cause variations in the capacity of the condenser, and corresponding changes in the frequency of oscillations in said circuit and means associated with said circuit responsive to change in frequency for determining the distance of the aeroplane from the ground.

8. An instrument as set forth in claim 7, wherein the said members are metallic horizontal plates, one near each tip.

9. In combination, an aircraft, a plurality of oscillatory circuits upon the aircraft, means for bringing the circuits into resonance, one of said circuits being subject to change of resonance with change in distance between the aircraft and the earth, and means for measuring the non-resonance of said circuits as a function of the distance for determining the change in distance between the earth and the aircraft.

10. An instrument for indicating the distance of an object above the ground, comprising two spaced articles, fixed on the object and providing a condenser having a capacity which is affected by the distance above the ground, and electrical connections between the articles and an electrical indicating device, whereby variations in the electrical capacity between the spaced articles cause variations in the indications of said device.

11. In apparatus for determining the distance between two objects, the combination of an electrostatic condenser carried on one of said objects and the dielectric of which is constituted by the atmosphere between the two objects whereby the capacity of the condenser is varied by the distance between the objects, means for impressing electrical oscillations upon the condenser, and means for indicating the effect upon the oscillations of the changes in capacity.

12. In apparatus for determining the altitude of an aircraft, the combination of an electrostatic condenser carried on the craft and the capacity of which is affected by the altitude of the aircraft, means for impressing electrical oscillations upon the condenser, and means for indicating the effect upon the oscillations of the changes in capacity.

13. The method of determining the distance between the earth and an aircraft, which method consists in forming on the aircraft an electrical condenser, the dielectric of which is constituted by the atmosphere between the earth's surface and the aircraft, whereby said condenser is subject to changes in capacity with change of distance between the aircraft and the earth, and measuring the change in capacity of said condenser as a function of such distance.

14. An instrument for indicating the distance of an aircraft above the earth, comprising an electrical oscillating circuit, a condenser associated with said circuit for varying the frequency of oscillations therein, the dielectric of said condenser being constituted by the atmosphere between the earth's surface and the aircraft, whereby variation of the distance of the craft above the earth causes variations in the capacity of the condenser and corresponding variations in the frequency of oscillations in said circuit, and frequency responsive means associated with said circuit for indicating the distance of the aircraft from the earth.

15. An instrument for indicating the distance of a body from a second body and adapted to be carried by the first body, comprising an electrical oscillating circuit, a condenser in said circuit formed by a plurality of capacity members which are fixed with respect to the body, said members being separated whereby variations of the distance between the two bodies cause variations in the capacity of the condenser and corresponding changes in frequency in said oscillating circuit, and indicating means connected to said circuit and responsive to the changes in frequency caused by such variations for indicating the distance between said bodies.

16. An instrument for the production of sounds of various characteristics to indicate the distance of an aircraft above the ground, comprising two capacity elements on the aircraft and the dielectric of which is constituted by the atmosphere between the aircraft and the ground whereby the electrical capacity between said elements is varied in accordance with the distance of the aircraft above the ground, and an electrical oscillating circuit including an audible indicator and said two capacity elements for audibly indicating the changes in capacity between said elements due to changes in the distance of the aircraft above the ground.

17. In apparatus for determining the height of an aeroplane above the ground, the combination of a device carried by the aeroplane and providing an electrostatic capacity having a dielectric constituted by the atmosphere between the aeroplane and ground whereby said capacity is varied by the variations in height of the aeroplane, and an electrical oscillating circuit tuned to different frequencies by the variations in capacity of the device whereby the change in frequency is a function of the change in the height of the aeroplane above the ground, and frequency responsive means associated with said electrical circuit for indicating said changes.

18. In apparatus for determining the distance between two objects, the combination of an electrical circuit arrangement for generating sustained oscillations, means carried by one of said objects and associated with said circuit arrangement and providing a capacitance having a dielectric which is varied by changes in the distance between said objects for varying the frequency of said oscillations as a function of said changes, and means included in said electrical circuit arrangement for indicating said changes.

19. An instrument for indicating the distance of an object above the earth, comprising an electrical oscillating circuit including a condenser carried by the object, said condenser having a dielectric constituted by the atmosphere between the objects and the earth whereby the capacity of said condenser is varied in accordance with the distance of the object from the earth thereby changing the frequency of the circuit, and a device responsive to said changes in frequency for indicating said distance above the earth.

ORIN E. MARVEL.